INVENTORS
EDWARD F. MYERS
JOHN R. PORT
BY Edward J. Feeney Jr.
ATTORNEY

INVENTORS.
EDWARD F. MYERS
JOHN R. PORT
BY Edward J. Feeney Jr.
ATTORNEY

INVENTORS
EDWARD F. MYERS
JOHN R. PORT
BY Edward J. Feeney Jr.
ATTORNEY

INVENTORS.
EDWARD F. MYERS
JOHN R. PORT
BY Edward J. Feeney Jr.
ATTORNEY

Sept. 9, 1969 E. F. MYERS ET AL 3,466,612

WIRED CORE MEMORY

Filed Dec. 7, 1966 8 Sheets-Sheet 6

INVENTORS.
EDWARD F. MYERS
JOHN R. PORT
BY Edward J. Feeney Jr.
ATTORNEY

INVENTORS.
EDWARD F. MYERS
JOHN R. PORT
BY Edward J. Feeney Jr.
ATTORNEY

United States Patent Office 3,466,612

Patented Sept. 9, 1969

3,466,612

WIRED CORE MEMORY

Edward F. Myers, East Lansdowne, and John R. Port, King of Prussia, Pa., assignors to Burroughs Corporation, Detroit, Mich., a corporation of Michigan Filed Dec. 7, 1966, Ser. No. 599,811
Int. Cl. G11b *13/00, 5/00;* G08b *23/00*
U.S. Cl. 340—172.5 10 Claims

ABSTRACT OF THE DISCLOSURE

The present invention discloses a wired core memory useful for permanently storing digital data. It also provides a unique organization for selectively activating the permanently stored data as well as a means for sequentially presenting portions of the data to an output register. This latter feat is basically accomplished by inhibiting all but a singular portion of the selected information being activated. The required symbol or character font so produced may be displayed upon a cathode ray tube operative in a standard television type raster mode and the present wired core memory is therefore especially useful as a symbol generator.

BACKGROUND OF THE INVENTION

Field of the invention

The present invention relates to the field of magnetic core memory devices such as are generally used in digital data processing systems. More particularly it relates to a magnetic core memory matrix which is especially useful as a symbol generator, since it is wired in a manner to provide a plurality of fixed symbolic configurations which include both alphanumeric and special symbols. These symbols may be coupled to a cathode ray tube (CRT) which is operating in a standard television type raster mode.

Description of the prior art

Previous wired core memory matrices have been provided which were capable of permanently storing digital data. An example of this prior art is illustrated in the Epstein et al. U.S. Patent No. 3,012,839 also assigned to the present assignee. However, as will be noted upon consideration of this earlier disclosure, the means of selectively providing output row portions of the selected symbol by inhibition of all other rows in the present device is completely new. In addition the present device uses what is believed to be a novel means of addressing the individual stored symbols over what has been done in the past.

Further, the applicant believes that the wired core memory is more economical than previous ones because of the simplicity of its addressing and selecting schemes. The applicant also considers the present memory to possess a considerably higher operating speed than most previous wired core memories of a similar type.

SUMMARY OF THE INVENTION

Briefly, the present invention provides a wired core memory in which a plurality of symbols are permanently stored. A novel addressing means made up of a matrix of Y switches and X drivers is also provided for selecting individual symbols from among those so stored. In addition, a unique system of output transfer is included which uses a novel system of inhibition drivers to enable successive portions of the selected symbol to be sequentially transferred into an output register for later serial transfer to and display upon a cathode ray tube which is operative in a standard television type raster mode.

BRIEF DESCRIPTION OF THE DRAWINGS

The disclosed invention may be more clearly understood when considered in connection with the accompanying drawings in which.

DESCRIPTION OF THE PREFERRED EMBODIMENT

Figure 1:
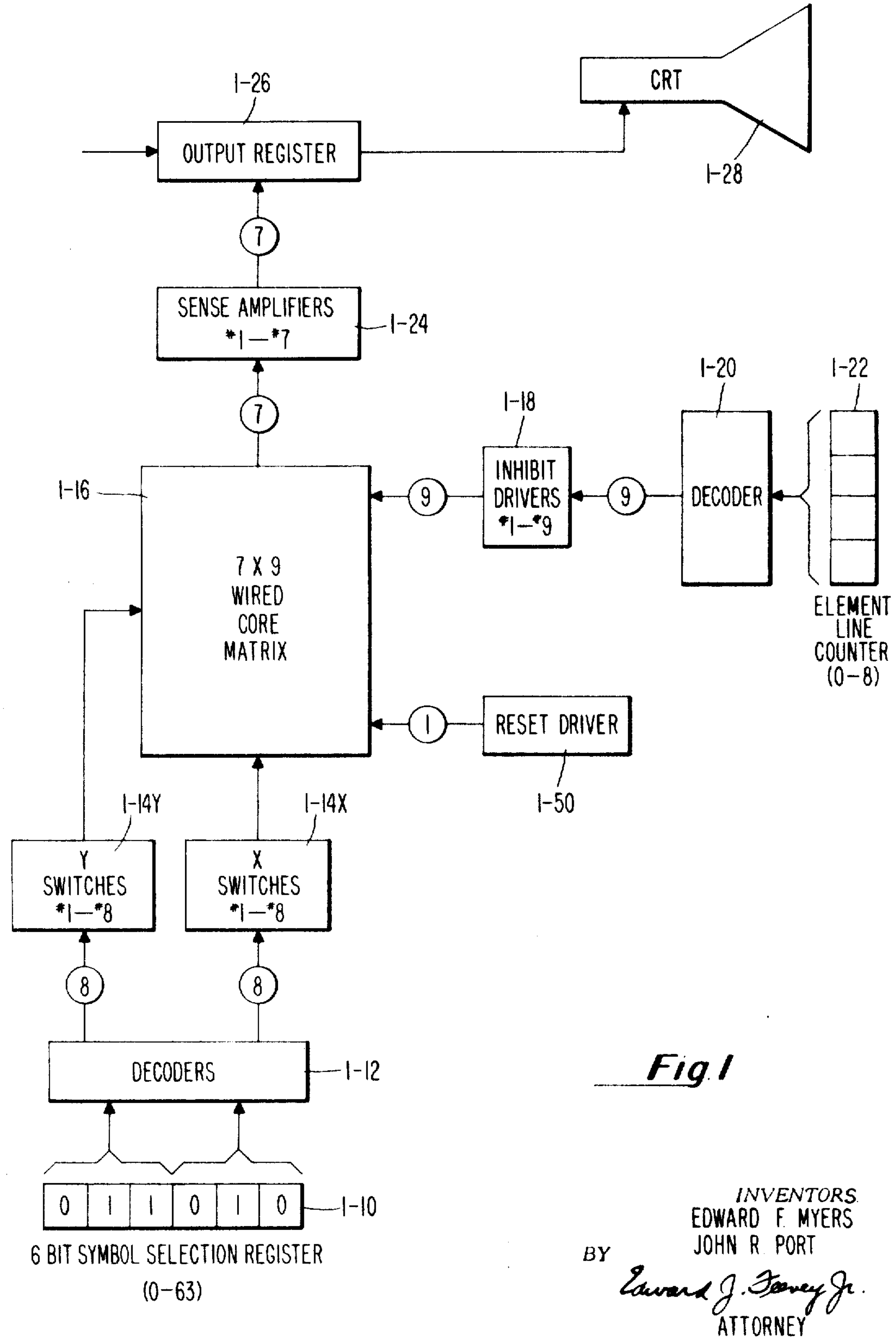
FIGURE 1 is a system block diagram of the proposed memory.

A useful application of a wired core memory presents itself in the form of a symbol generator. FIGURE 1 is a block diagram of a system wherein a wired core matrix is used to produce the required character font to a cathode ray tube which is operating in a standard television type raster scan mode.

Sixty-four alphanumeric and special symbols are stored in the wired core matrix 1–16. The character font for each symbol is contained in a 7 x 9 matrix of 63 cores. The symbol can be considered to be made up of 63 dots, although in the operative system they are small lines. The width of the symbol is 7 cores and its height 9 cores. For each symbol the information stored (wired) in these cores is scanned 9 times, in groups of 7 cores. The output from each successive group is presented in the proper time sequence to an output register 1–26 via the sense amplifiers 1–24. The content of the register 1–26 is, in turn, presented to the cathode ray tube (CRT) 1–28.

The operation of the system shown in FIGURE 1 is as follows. The binary code (0–63) for the desired character is placed in the character or symbol selection register 1–10. This is decoded by decoder 1–12 into two groups (3 bits each) and each output activates one of 8 switches in the switch group 1–14X as well as one of the eight switches in switch group 1–14Y. This group of sixteen switches form an 8 x 8 matrix connected to the wired core memory such that only one symbol line is activated, i.e. the line of the selected character. This line is threaded through the 7 x 9 core matrix 1–16 to give the required character information.

The element line counter 1–22 steps sequentially through nine steps (0–8). At each step, the decoder 1–20 causes one of the nine inhibit drivers 1–18 to be activated such that only one row group of 7 cores are active, all other cores in the matrix being inhibited. Seven sense lines are threaded through the cores in columnar fashion, hence the sense amplifiers 1–24 are sequentially presented with 7 bits of information 9 times. This information is thereafter transferred to an output register 1–26 which serially presents the information to the cathode ray tube (CRT) 1–28.

Figure 2:
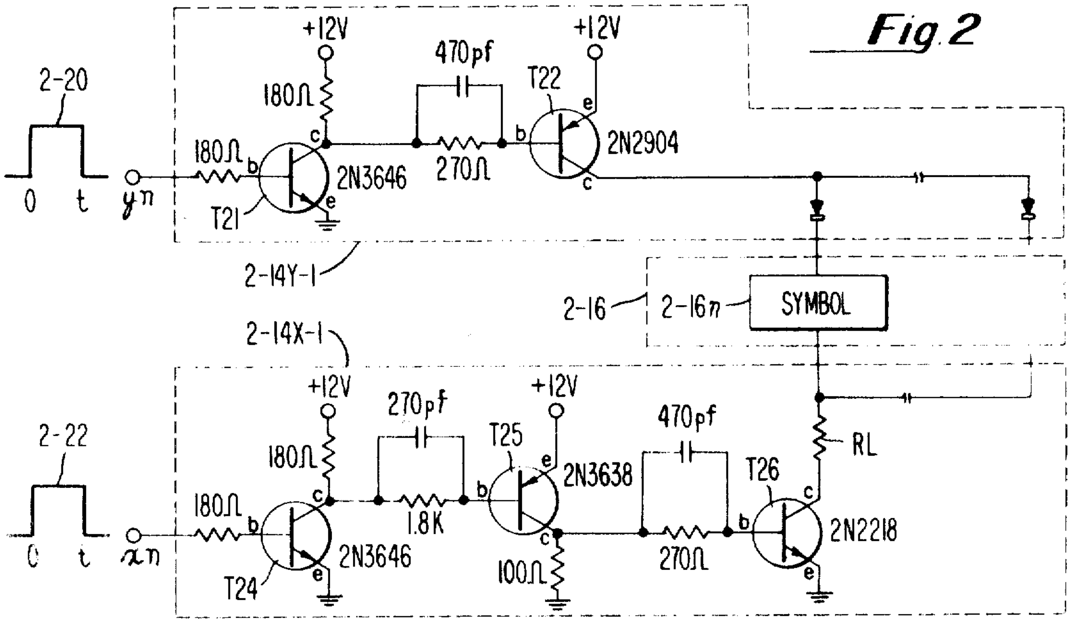
FIGURE 2 is a detailed schematic of one of the switches and one of the drivers utilized by the selection matrix.

Referring next to FIGURE 2, the contents of the character register 1–10 in FIGURE 1 are decoded such that two switches, an X and a Y, are activated. They are referred to generally in the figure as 2–14X–1 and 2–14Y–1. This simultaneous activation is caused by signals 2–22 and 2–20 being applied concurrently. This concurrent activation causes current to flow in one of the 64 symbol lines 2–16*n* of the wired core memory 2–16.

It should be noted here that the switches 2–14X illustrated throughout this application are also referred to herein as line drivers or more simply drivers. However, those switches denoted as 2–14Y are consistently referred to as switches.

The application of the positive going pulse 2–20 to the switch circuit 2–14X–1 provides a forward bias to the base emitter junction of the transistor T21. The collector current caused to flow by this bias effectively grounds its collector electrode C. This transistor action, in turn, activates the following transistor T22 and its collector C is effectively placed at approximately the same positive potential applied to its emitter *e*. Consequently, this sequence places a positive potential on one end of a selected symbol line.

At the same time the pulse 2–20 is applied, another positive going pulse 2–22 is applied to the input transistor T–24 of the transistor driver 2–14X–1. Similar transistor action causes successive activation of transistors T25 and T26. Finally the activated transistor T26 in conjunction with its collector resistor $R_L$ and its grounded emitter completes the circuit to ground via the selected symbol line. From this description it is readily apparent that by simultaneous application of two pulses to a particular driver each of the sixty-four stored symbols may be individually selected.

Figure 3:
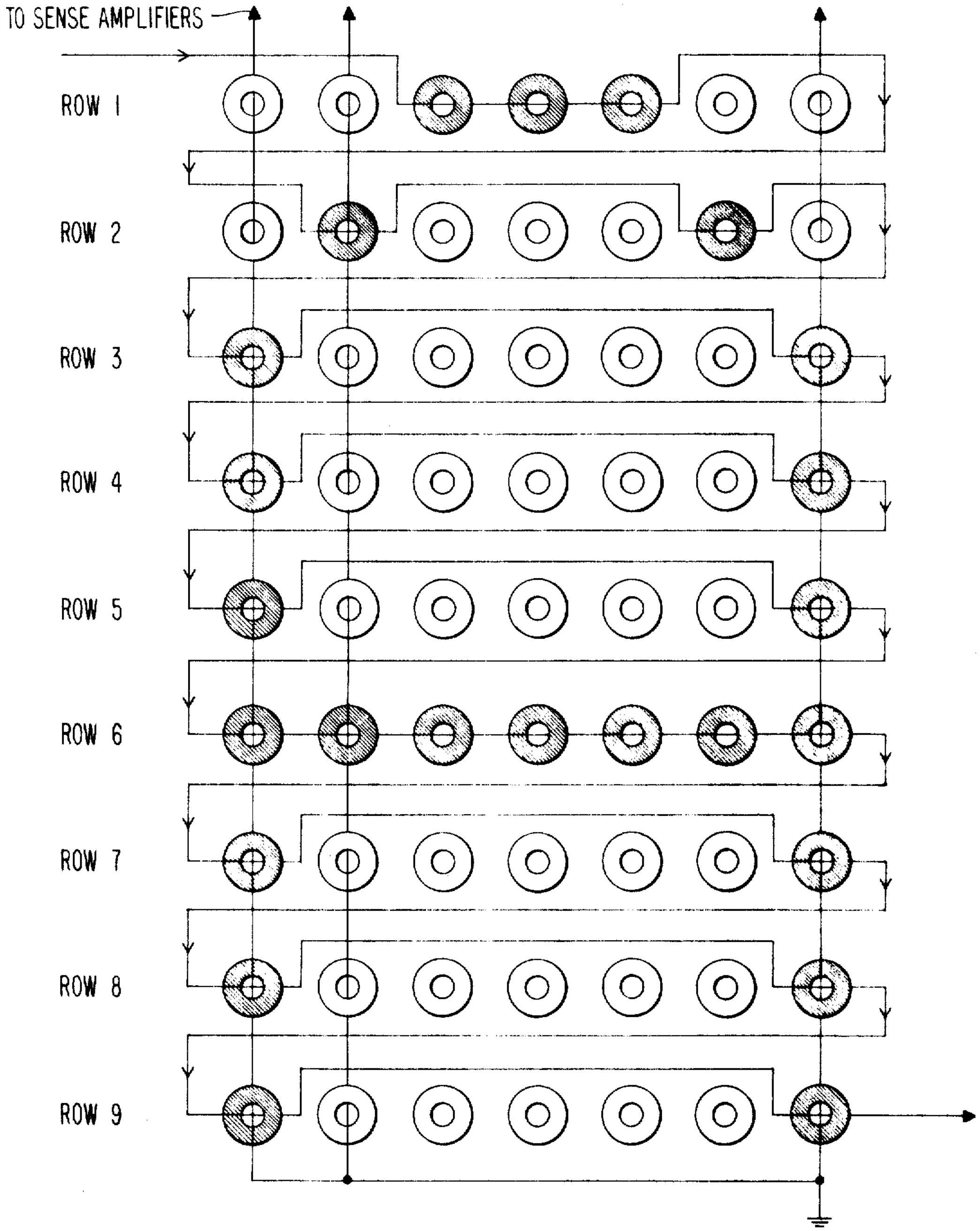
FIGURE 3 is a detailed illustration of the unique manner in which thes selection lines are threaded through the cores to provide a specific symbol together with the individual column sense lines.

FIGURE 3 illustrates the core stringing technique involved in a core matrix of nine rows by seven columns to provide the symbol A. Those cores through which the A drive line is threaded are cross-hatched in an effort to emphasize their location.

Its operation may best be described by considering it together with FIGURE 1. After resetting the entire matrix by the reset driver 1–50, the current in the selected line is applied in the direction which will set all of the cores through which it threads. However, at this time, one of the 9 inhibit drivres 1–18 of FIGURE 1 will be on, hence only those cores in the group of seven which is not threaded by the inhibit driver will be set. During the setting of these cores, a signal will be developed across the respective sense lines and fed to the sense amplifier from which it is gated into the output register 1–26. Actually the cores need not be completely set since the information is available during the setting time. When this occurs, the reset driver 1–50 is again activated. Since it threads through all of the cores it resets those cores which were either fully or partially set. At the appropriate time, the element line counter 1–22 is stepped to activate the next of the nine inhibit drivers 1–18 and the selected symbol line is again pulsed to give the next row group of 7 bits of information.

Figure 4:
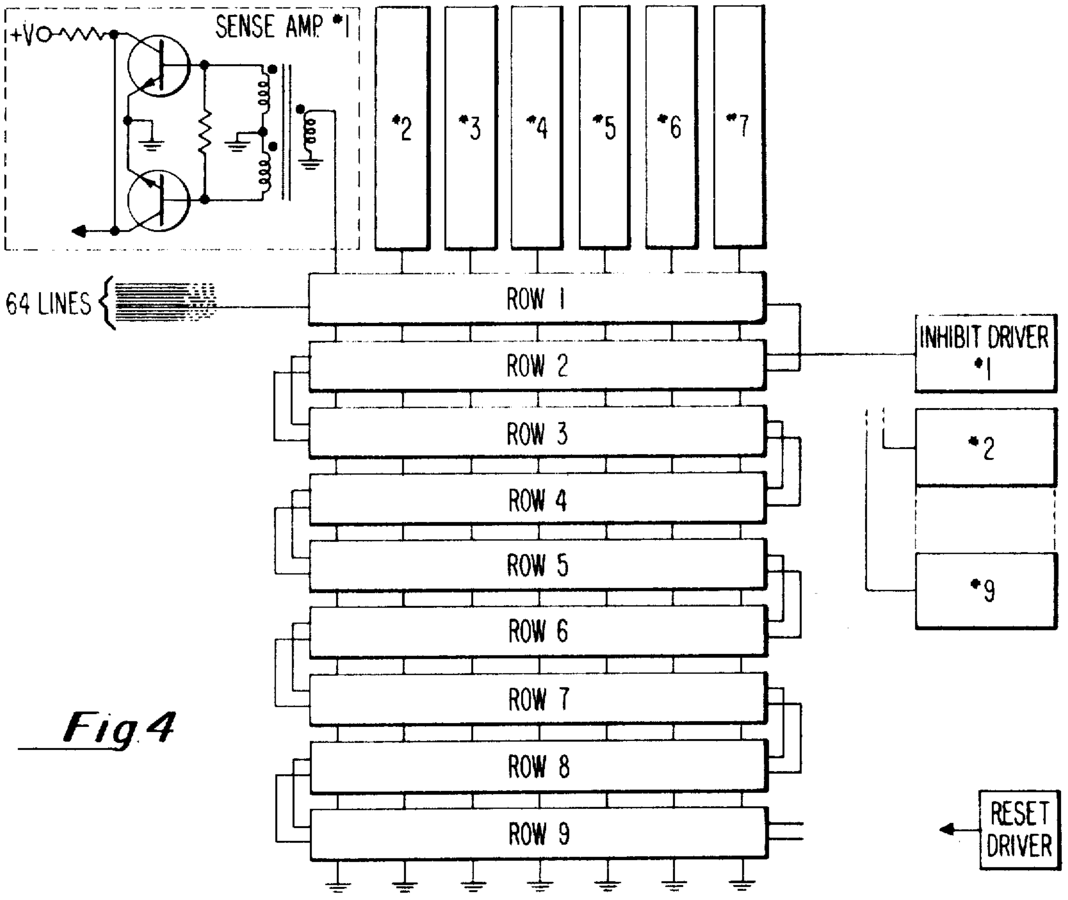
FIGURE 4 is a simplified schematic and partial block diagram of the combined selection, inhibition sense and reset portions of the present invention.

Although it should be apparent from FIGURE 3 that additional lines may be used in this matrix, FIGURE 4 has been included to more clearly illustrate this feature.

Also shown in FIGURE 4 is the connection of the sense amplifiers to the matrix.

Referring to FIGURE 4, there is illustrated the sixty-four symbol lines entering the upper left-hand corner of the matrix. On the upper-right hand side of the matrix, one of the inhibit drivers is also generally illustrated entering the matrix. In addition the other eight inhibit line drivers are also shown.

In the lower right-hand corner, the reset driver is shown to better orient the illustrated matrix with relation to its general configuration in FIGURE 1.

As was seen in FIGURE 3, each of the sixty-four symbol selection lines enters the matrix passing through some of the cores, but by-passing others. In this way only certain of the cores, all of which have been previously reset, will be set by the selection lines. That is, only those cores through which the selected line passes will be "set." Subsequently, the nine inhibit drivers will sequentially enable each of the nine rows of cores by inhibiting all rows except the one to be "read."

Returning to FIGURE 4, there is shown a partial block, partial schematic diagram of the wired core memory in a row by row configuration to more clearly illustrate the application of the 64 symbol selection lines to the matrix. In addition, the columnar connections of the seven sense amplifiers are also illustrated. Only one, however, is shown in any detail. Further the inhibit driver #1 is also shown entering row #2 of the matrix and thereafter passing through rows #3–9 to inhibit rows #2–9 from providing an output signal to the sense amplifiers during the period that row #1 is being sensed.

Figure 5A:
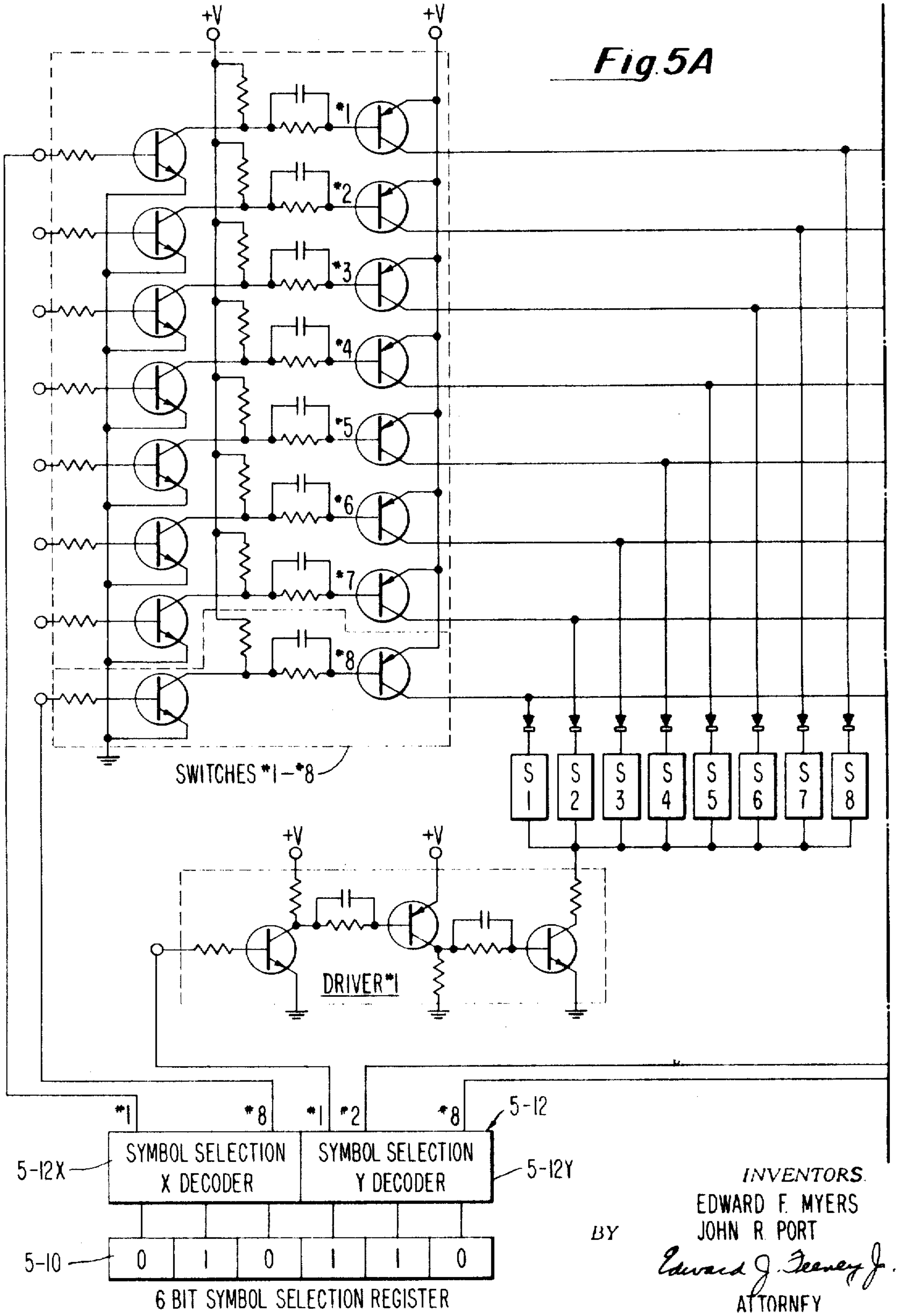
FIGURE 5 includes FIGURES 5A and 5B and shows a detailed illustration of the symbol selection matrix.
Figures 5, 5B:
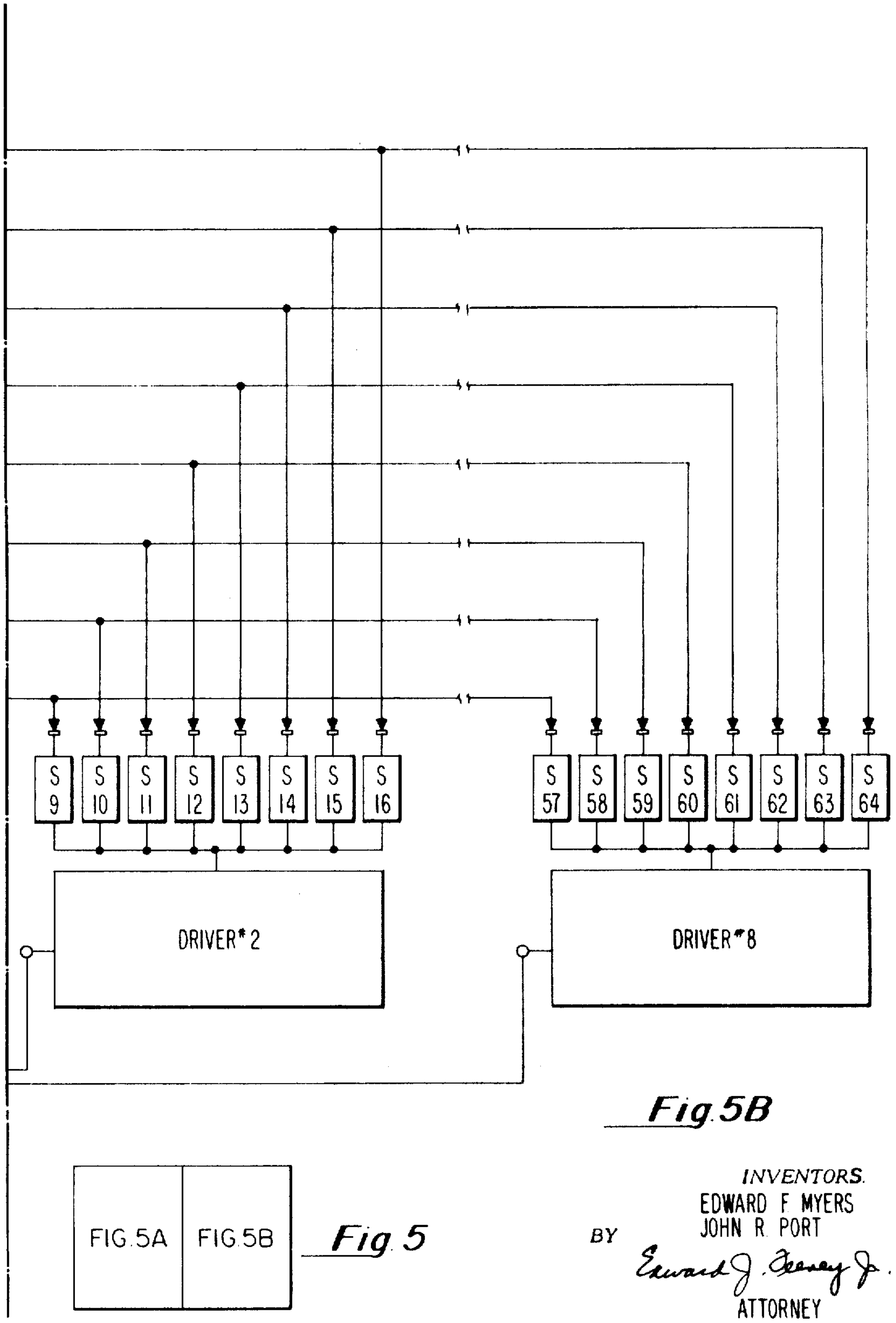

FIGURE 5 includes FIGURES 5A and 5B. It illustrates in detail the symbol selection scheme used in a preferred embodiment of the present invention. The plurality of eight switches are shown in line down the left-hand side of the drawing. The sixty-four symbols S1 to S64 are shown approximately across the center of the drawing. It should be noted that these sixty-four blocks represent the sixty-four individual alphanumeric and special symbols which are permanently stored in the memory.

Immediately below the symbols are the eight (8) line drivers #1–8. A symbol selection decoder 5–12, including an X decoder 5–12X and a Y decoder 5–12Y creates a switch and a driver signal. The particular switch and driver to be activated is determined by the contents of the six bit symbol selection register 5–10. The operation of the selection circuitry is as follows:

A six bit address previously placed in the selection register 5–10 is applied in a pair of three bit groups to an X and a Y decoder 5–12X and 5–12Y respectively. If, for example, a signal is applied to switch #8 from the X decoder while a concurrent signal is applied to driver #1, by the Y decoder, the symbol S1 will be activated.

Similarly, any one of the sixty-four symbols may be activated by the application of its corresponding 6 bit address to the symbol selection register 5–10.

Figure 6A:
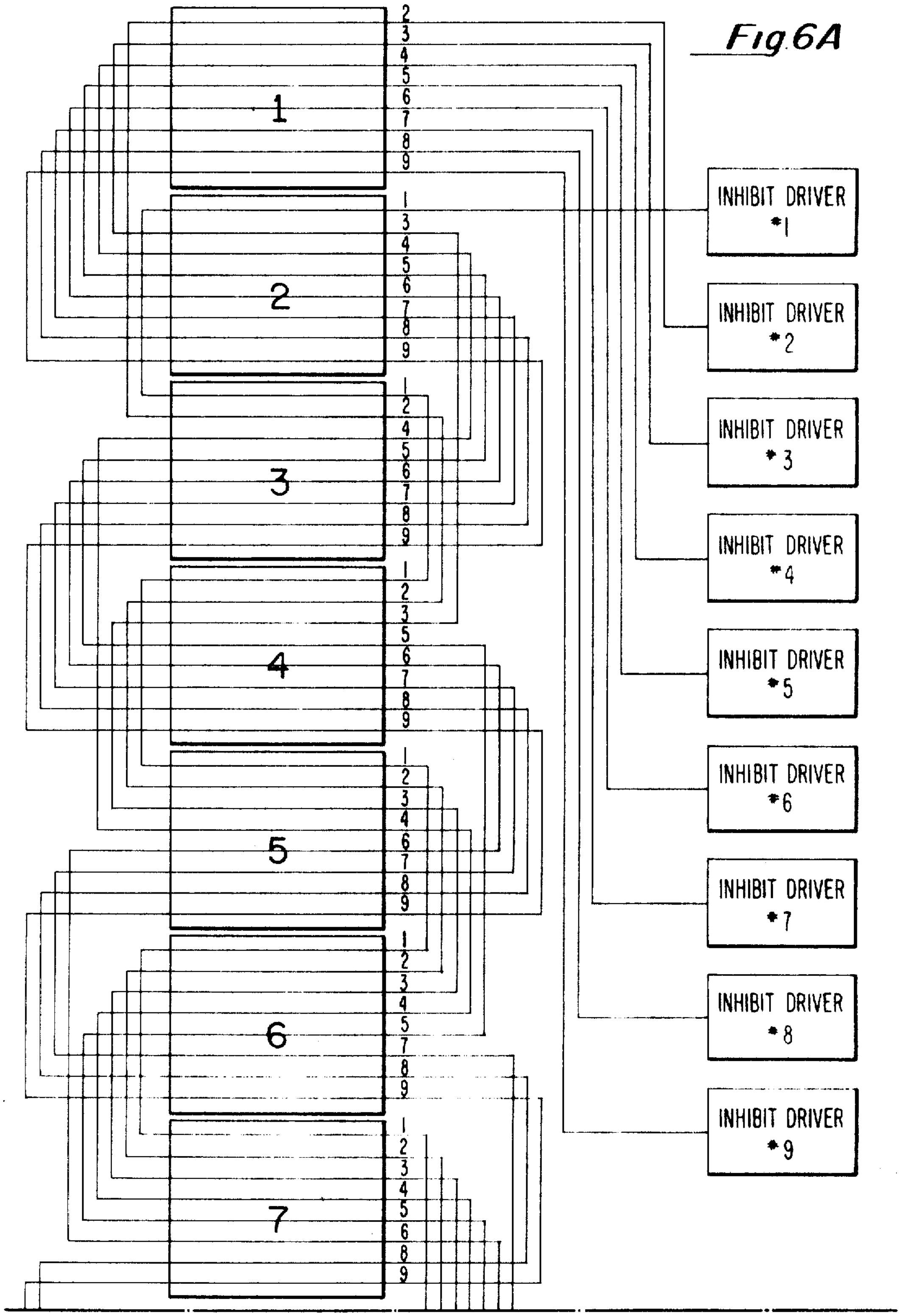
FIGURE 6 includes FIGURES 6A and 6B and illustrates a detailed schematic of the inhibition system utilized showing the line threading scheme through the core rows of the memory matrix.
Figure 6B:
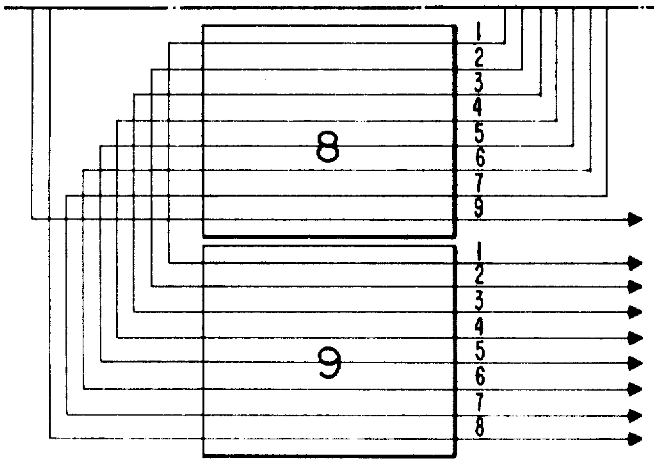
Figure 6:
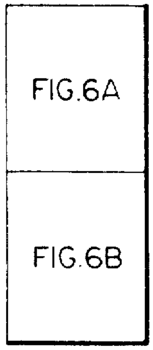

Referring next to FIGURE 6, which includes FIGURES 6A and 6B, there is shown a detailed schematic of the inhibition system utilized in the present embodiment. A group of nine (9) inhibit drivers are lined down the right-hand side of the figure. From each driver, a single output line is threaded through eight of the nine core rows. The nine core rows are illustrated in block form central to the figure. The numbers listed adjacent the right-hand side of each numbered core row block indicate the inhibit driver lines which pass through that particular row of cores. For example, the output line from inhibit driver #1 enters the row #2 block and follows through row blocks #3–9. In this way the only row of cores which is not inhibited (uninhibited) by the inhibit driver #1 is the core row #1. Likewise, the only core row not inhibited by inhibit driver #2 is core row #2. This is equally true for the remaining core rows.

It should be noted here that the passage of each inhibit drive line through a core row is in a direction which will prevent the core row from being switched when current is passed through that inhibit line. Thus, while the inhibit lines are shown in the figure as passing in opposite directions through alternate core rows, such is not the actual case, and the reason they are so shown is for the sake of simplicity. In reality they pass through each row in the same direction.

Figure 7:
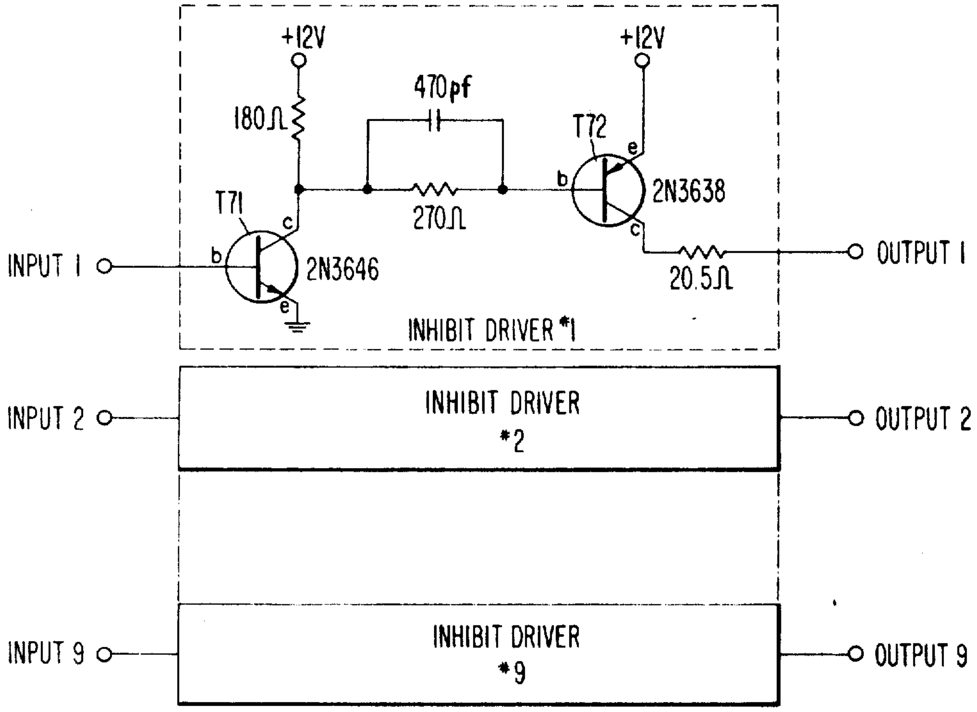
FIGURE 7 is a detailed schematic of an inhibition driver circuit.

Consider next FIGURE 7, which illustrated in detail one of the nine inhibit drivers. It also shows in block form the remaining eight inhibit drivers #2–9.

The component values and types given therein as well as any other values or types listed in any other part of this specification are purely representative and illustrate only one suggested embodiment of the invention. They are not specified to denote a limitation of the operation of this invention to the particular components listed.

The operation of the inhibit driver illustrated is straightforward. The application of an inhibit signal to inhibit driver #1 is through the base element *b* of transistor T71. The activation of T71 effectively grounds its collector *c* which in turn activates transistor T72. This latter activation applies the positive voltage connected to the emitter *e* of T72 to its output line to thereby supply inhibition signal #1.

Figure 8:
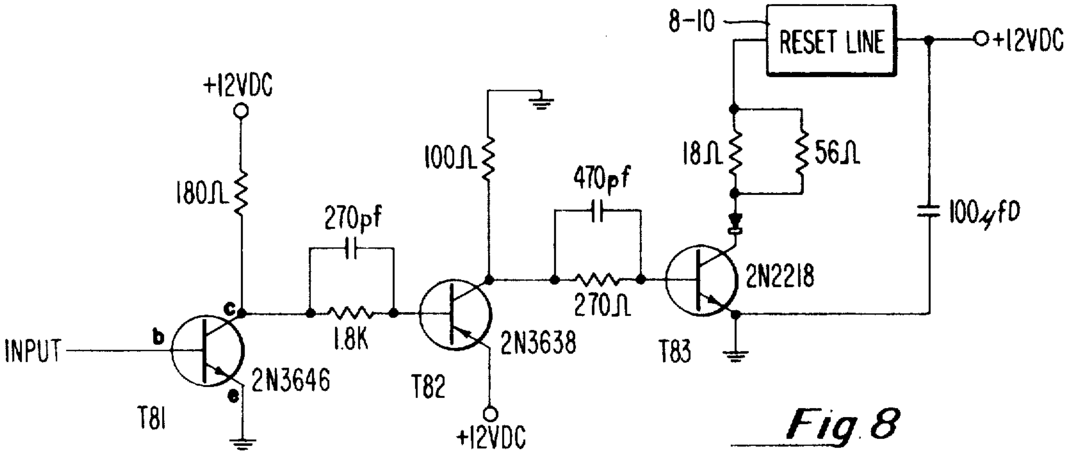
FIGURE 8 is a detailed schematic of the reset circuit used.

FIGURE 8 is a detailed illustration of the reset driver generally shown in FIGURES 1 and 4. It also includes representative component values and types. The application of an input signal to the base *b* of transistor T81 activates the transistor to effectively ground its collector *c*. This, in turn, switchably activates the transistor T82 to cause the transistor T83 to be activated. This latter activation completes the circuit through the reset line 8–10 from the positive voltage source connected to its right-hand end through the transistor T83 to ground.

Figure 9:
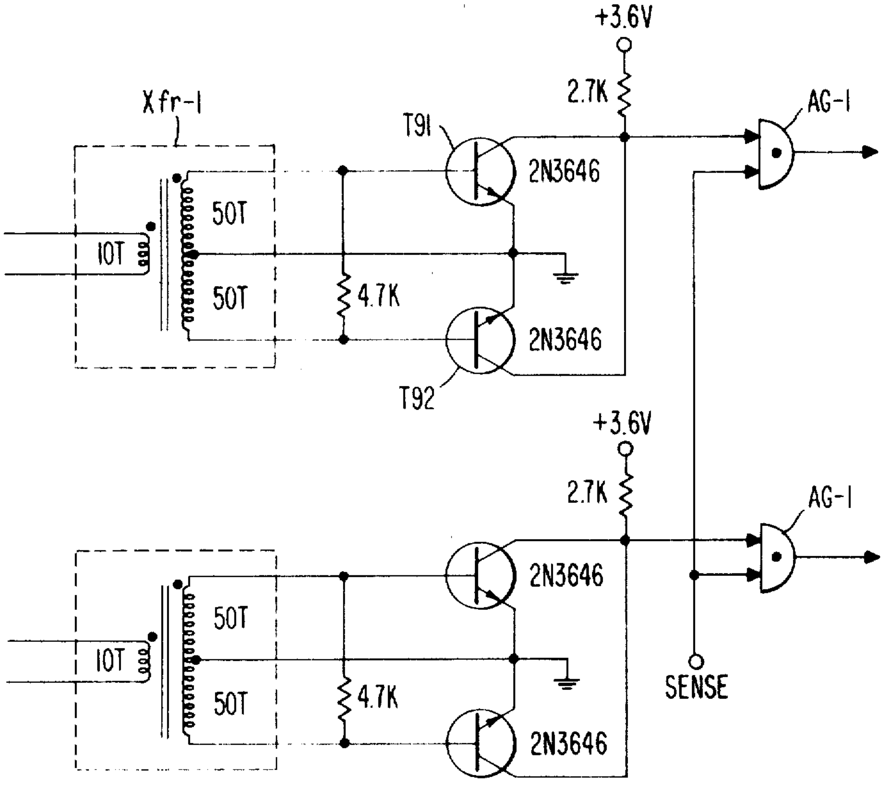
FIGURE 9 is a detailed schematic of a pair of sense amplifiers.

FIGURE 9 is also a detailed illustration, showing representative values of a circuit shown more generally in other figures of this application. It suggests a particular embodiment of a pair of sense amplifiers for use in the present memory system. Only one of the pair will be described since they are identical. A pair of twisted input leads receives the input sense lines and connects them to the primary of a transformer X*fr*–1. The secondary of this transformer applies this received signal to a pair of parallel connected transistors T91 and T92. The common output from these transistors is thereafter connected to an AND gate AG–1. This gate is opened by the application of a sense enabling signal which is simultaneously applied to all of the AND gates associated with sense amplifiers #1–7.

OTHER APPLICATIONS

The above description is for a symbol generator which directly provides video information for a faster scan type system. The wired core matrix can form the basis for providing information for a stroke type symbol generator for use on an X–Y–Z monitor. In this instance the symbol selection remains the same. The element line counter would become the stroke counter, 0 through X number of strokes. The sense lines would be wired the same, but the sense amplifiers would feed a group of storage elements which represent the X deflection magnitude (direction), Y deflection magnitude (direction), blanking, and end of character. Integrators would be driven from the X and Y elements to provide the proper deflection. A separate digital to analog computer would provide positioning.

Another application might be a fixed program memory. In this case the memory address would be made up of three parts: the X and F from the character register, and the element line counter. For example, assume a 16 bit memory which would mean 16 cores across the matrix. Further, assume 16 rows of cores as a 16 x 16 matrix (256 cores). If the character register remained the same (6 bits), 64 wires could be threaded through the cores in a unique pattern. As the element line counter is stepped, 1 through 16, 1024 16 bit words could be obtained. It is conceivable that 128 wires could thread the cores, hence, 2048 words could be obtained in only 256 cores. Furthermore, the circuits are simple and the memory cycle time is relatively fast ($<2$ μsec.).

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A wired core memory organization comprising: a core matrix of $x$ columns and $y$ rows of magnetic cores, a plurality of wire selectively threaded through successive rows of said matrix to store a single symbol in said core matrix for each of said plurality of wires, means connected to said symbol wires for selecting one of said plurality and activating the magnetic cores through which it threads, means coupled to said matrix for sequentially inhibiting the activation of the cores in $y-1$ rows of said matrix such that successive single rows remain uninhibited, and means coupled to said matrix for successively sensing the selectively activated content of each uninhibited row as it is sequentially stepped through all $y$ rows of said matrix.

2. The wired core memory organization as set forth in claim 1 wherein the means for selecting one of the plurality of wires includes a set of line switches each commonly connected to one end of a separate plurality of said wires and a set of line drivers each commonly connected to the opposite ends of a respective group of wires created by combining one wire from each of said separate pluralities of wires.

3. The wired core memory organization as set forth in claim 1 wherein said means coupled to said matrix for successively sensing the selectively activated content of each uninhibited row includes an $x$ plurality of sense amplifiers respectively coupled to each of the $x$ columns of said matrix by a sense line threaded through all of the magnetic cores in each of said $x$ columns.

4. The wired core memory organization as set forth in claim 2, further including a means for selectively addressing each of said symbol selection lines by concurrently activating one of said line switches and one of said line drivers, a plurality of $y$ core row inhibition drivers each connected to an inhibition line selectively threaded through a plurality of different groups of $y-1$ core rows, a plurality of $x$ column sense amplifiers, each connected to a sense line commonly threaded through the cores of a separate column of said matrix, and a common reset means connected to a line commonly threaded through all of the cores in said matrix.

5. The wired core memory organization as set forth in claim 4 wherein said means for selectively addressing each of said symbol selection lines includes a symbol selection binary register having a bit length capable of temporarily storing individual addresses for each of the plurality symbols and a decoding circuit coupled to said register which is responsive to said stored address to concurrently select one of said plurality of line switches and one of said plurality of line drivers for simultaneous activation.

6. A symbol generator including a wired core memory comprising: a magnetic core matrix having $x$ columns and $y$ rows, a plurality of symbol selection lines selectively threaded through successive rows of said core matrix, a plurality of line switches each connected to one end of a separate group of selection lines, a plurality of line drivers, each connected to the opposite end of one line in each of said separate groups of selection lines, a means for selectively addressing each of said symbol selection lines by concurrently activating one of said line switches and one of said line drivers, a plurality of $y$ core row inhibition drivers each connected to an inhibition line selectively threaded through a plurality of $y$ different groups of $y-1$ core rows, a plurality of $x$ column sense amplifiers, each connected to a sense line commonly threaded through the cores of a separate column of said matrix, a common reset means connected to a line commonly threaded through all of the cores in said matrix, an output register coupled to said plurality of sense amplifiers to receive the output signals therefrom in parallel and a cathode ray tube connected to said output register to sequentially display the successively received content of said output register.

7. The symbol generator as set forth in claim 6 wherein said means for selectively addressing each of said symbol selection lines includes a binary address register capable of addressing each of said symbol selection lines and a decoder connected between said register and said line switches and line drivers capable of activating separate pairs of said line switches and line drivers for individual addressing of each of said lines.

8. The symbol generator as set forth in claim 6 wherein said plurality of $y$ core row inhibition drivers are activated by a decoder circuit which is, in turn, activated by a binary counter, said counter being capable of cyclically counting each of said rows in said matrix and of causing in conjunction with said decoder the activation of an inhibit driver corresponding to said row to be uninhibited.

9. A symbol generator comprising: a core matrix of $x$ columns and $y$ rows of magnetic cores, a plurality of wires selectively threaded through successive rows of said matrix to form an equal plurality of symbols, means connected to both ends of each of said symbol wires for selecting one of said plurality and activating the magnetic cores through which it threads, means coupled to said matrix for inhibiting the activation of such threaded cores in $y-1$ rows of said matrix, means connected to the inhibiting means for sequentially shifting the $y-1$ rows of said matrix so inhibited such that the uninhibited row is successively stepped through all $y$ rows of said matrix, means coupled to said matrix for sensing and amplifying the selectively activated content of the uninhibited row as it is sequentially so stepped and for providing a plurality of corresponding output signals, means connected to said sensing and amplifying means for receiving and temporarily storing said output signals, and display means connected to said temporary storing means for providing a visual display corresponding in configuration to said selected symbol in said matrix.

10. The symbol generator as set forth in claim 9 wherein said temporary storing means is a binary register of $x$ bit length capable of receiving the sensed signals in parallel and of transmitting the signals serially to said display means.

References Cited

UNITED STATES PATENTS

| | | | |
|---|---|---|---|
| 2,920,312 | 1/1960 | Gordon et al. | 340—174 |
| 3,012,839 | 12/1961 | Epstein et al. | 346—74 |
| 3,024,454 | 3/1962 | Chaimowicz | 340—324 |
| 3,109,166 | 10/1963 | Kronenberg et al. | 340—324 |
| 3,140,473 | 7/1964 | Gaffney | 340—174 |
| 3,175,208 | 3/1965 | Simmons | 340—324 |
| 3,302,179 | 1/1967 | Osborn et al. | 340—172.5 |
| 3,305,841 | 2/1967 | Schwartz | 340—172.5 |

RAULFE B. ZACHE, Primary Examiner

U.S. Cl. X.R.

340—174, 324